US010565847B2

(12) United States Patent
Feng

(10) Patent No.: US 10,565,847 B2
(45) Date of Patent: Feb. 18, 2020

(54) MONITORING BRACELET AND METHOD OF MONITORING INFANT

(71) Applicants:Fu Tai Hua Industry (Shenzhen) Co., Ltd., Shenzhen (CN); HON HAI PRECISION INDUSTRY CO., LTD., New Taipei (TW)

(72) Inventor: Yu-Zhong Feng, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 151 days.

(21) Appl. No.: 15/942,410

(22) Filed: Mar. 30, 2018

(65) Prior Publication Data
US 2019/0035246 A1    Jan. 31, 2019

(30) Foreign Application Priority Data

Jul. 31, 2017  (CN) .......................... 2017 1 0642528

(51) Int. Cl.
| | | |
|---|---|---|
| G08B 21/02 | (2006.01) | |
| H04N 7/18 | (2006.01) | |
| G01B 11/02 | (2006.01) | |
| G06T 7/62 | (2017.01) | |
| G06K 9/20 | (2006.01) | |
| G08B 21/08 | (2006.01) | |
| G06K 9/00 | (2006.01) | |

(52) U.S. Cl.
CPC ........ *G08B 21/0288* (2013.01); *G01B 11/022* (2013.01); *G06K 9/209* (2013.01); *G06T 7/62* (2017.01); *G08B 21/02* (2013.01); *G08B 21/088* (2013.01); *H04N 7/183* (2013.01); *H04N 7/188* (2013.01); *G06K 9/00201* (2013.01); *G06T 2207/30201* (2013.01)

(58) Field of Classification Search
CPC .......................... G08B 21/0288; G08B 21/088
See application file for complete search history.

(56) References Cited

U.S. PATENT DOCUMENTS

| | | | | |
|---|---|---|---|---|
| 7,479,891 B2* | 1/2009 | Boujon | ................... | E04H 4/065 |
| | | | | 340/539.1 |
| 2008/0266118 A1* | 10/2008 | Pierson | ................ | A61B 5/0205 |
| | | | | 340/573.6 |
| 2013/0057702 A1* | 3/2013 | Chavan | .............. | H04N 5/23258 |
| | | | | 348/169 |
| 2015/0042795 A1* | 2/2015 | Tsuria | ........................ | A63F 1/00 |
| | | | | 348/143 |

* cited by examiner

*Primary Examiner* — Rowina J Cattungal
(74) *Attorney, Agent, or Firm* — ScienBiziP, P.C.

(57) ABSTRACT

A monitoring bracelet worn on an infant includes a camera, a prompter, a storage, and a processor. The processor controls the camera, when an object is grasped in a hand of the infant, to capture an image of the object. The processor analyzes size dimensions of the object according to the image and determines whether the object is able to fit inside the mouth of the infant, controls the camera to detect the object in real time when the object is determined to be able to fit inside the mouth of the infant and detects whether the mouth of the infant is opened, and controls the prompter to emit a prompt when the camera detects that the object is held steady in the hand of the infant and the mouth of the infant is opened.

12 Claims, 6 Drawing Sheets

MONITORING BRACELET AND METHOD OF MONITORING INFANT

CROSS-REFERENCE TO RELATED APPLICATIONS

This application claims priority to Chinese Patent Application No. 201710642528.2 filed on Jul. 31, 2017, the contents of which are incorporated by reference herein.

FIELD

The subject matter herein generally relates to infant monitoring devices, and more particularly to a monitoring bracelet and a method for monitoring an infant.

BACKGROUND

Generally, it can be helpful to have an ability to monitor infants to make sure they don't swallow objects.

BRIEF DESCRIPTION OF THE DRAWINGS

Implementations of the present disclosure will now be described, by way of example only, with reference to the attached figures.

DETAILED DESCRIPTION

Figure 1:
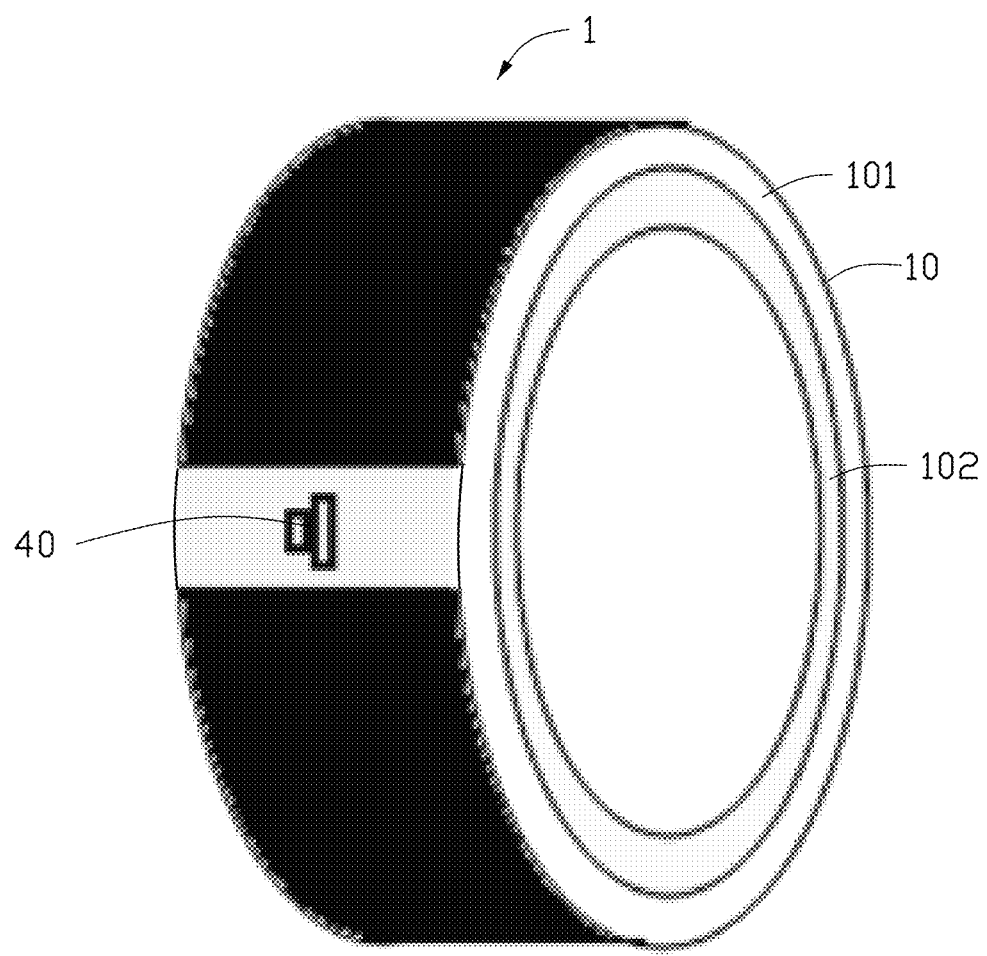
FIG. 1 is an isometric diagram of an embodiment of a monitoring bracelet in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 2:
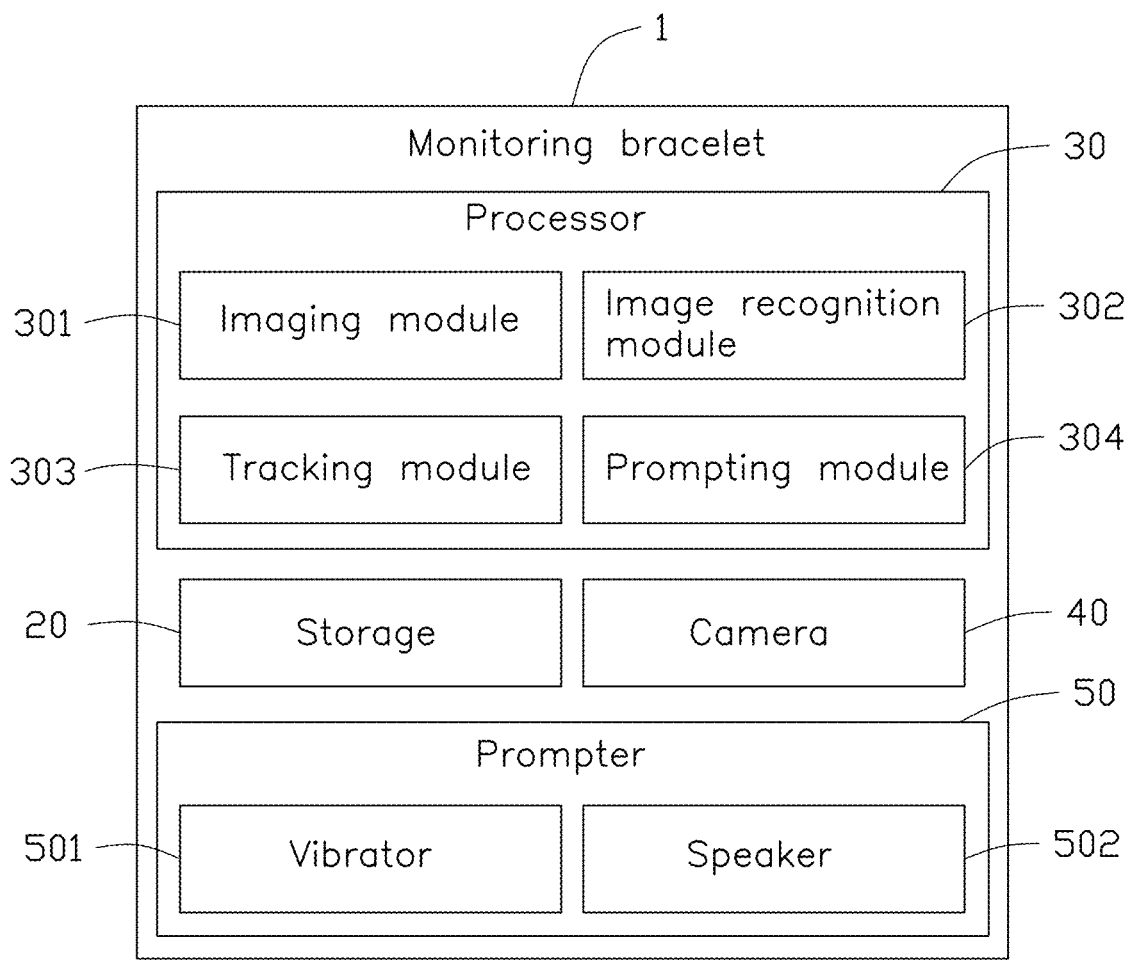
FIG. 2 is a block diagram of the monitoring bracelet of FIG. 1.

FIG. 1 and FIG. 2 illustrate an embodiment of a monitoring bracelet 1. The monitoring bracelet 1 includes, but is not limited to, a wristband 10, a storage 20, a processor 30, a camera 40, and a prompter 50.

Referring to FIG. 1, the wristband includes a first protective layer 101 and a second protective layer 102. The first protective layer 101 is arranged on top of the second protective layer 102 to cover the second protective layer 102. The second protective layer 102 includes therein a motherboard (not shown) of the monitoring bracelet 1. The storage 20, the processor 30, and the prompter 50 are integrated on the motherboard.

The storage 20 stores size dimensions of an opened mouth of an infant. In at least one embodiment, the size dimensions include a height "x" and a width "y". The camera 40 is arranged on the first protective layer 101 of the wristband 10. In at least one embodiment, the camera 40 is a 360 degree camera. When the monitoring bracelet 1 is worn on a wrist of the infant, the camera 40 faces a palm of the infant.

Referring to FIG. 2, the processor 30 includes an imaging module 301, an image recognition module 302, a tracking module 303, and a prompting module 304. The modules 301-304 can include one or more software programs in the form of computerized codes stored in the storage 20. The computerized codes can include instructions executed by the processor 30 to provide functions for the modules 301-304.

Figure 3:
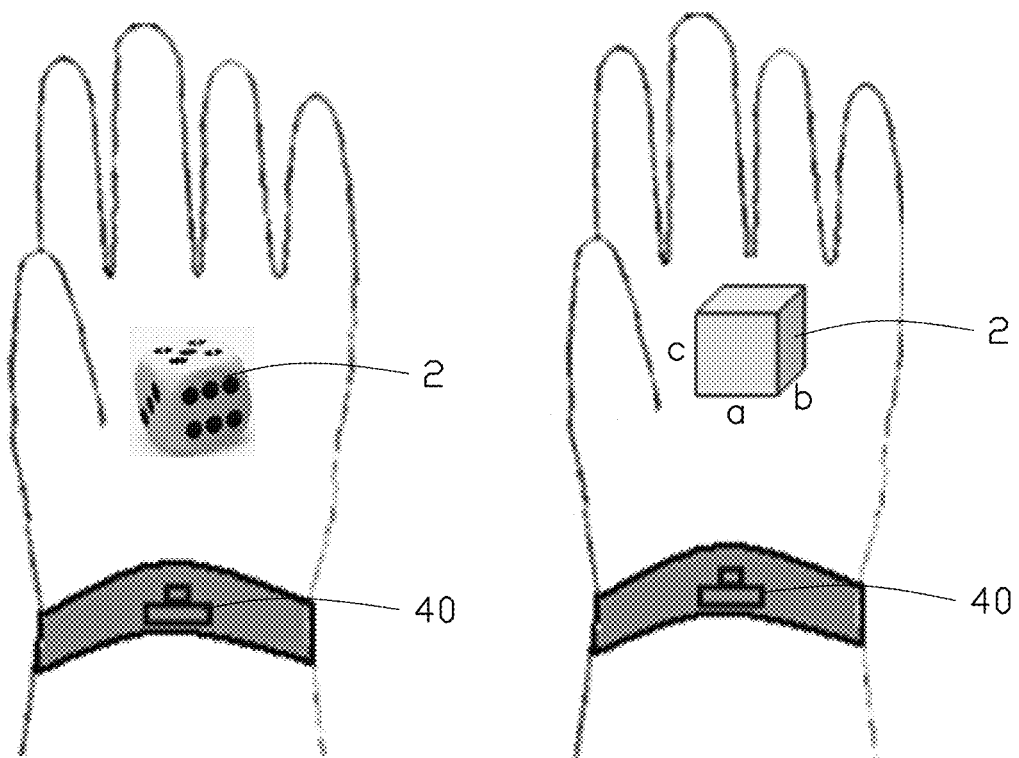
FIG. 3 is a diagram of an object having a regular shape.

Referring to FIG. 3, when an infant wears the monitoring bracelet 1, the imaging module 301 controls the camera 40 to detect in real time whether the hand of the infant grabs an object 2 and controls the camera 40 to capture an image of the object 2. In at least one embodiment, the imaging module 301 detects contours of the object 2 in the image, and determines that the object 2 has been grabbed upon detection of contours in the image.

The image recognition module 302 detects size dimensions of the object 2 in the image and determines whether the object 2 is able to fit inside the opened mouth of the infant.

In detail, when the object 2 is a regular shape, a length, a width, and a height of the object 2 are determined, and a product of length*width, length*height, and width*height is calculated to determine whether any product is smaller than a product of the width*height of the opened mouth of the infant. When any product is smaller than the product of the width*height of the opened mouth of the infant, then it is determined that the object 2 is able to fit inside the opened mouth of the infant.

For example, referring to FIG. 3, the object 2 having a rectangular block shape has a length "a", a width "b" and a height "c". When any of the products a*b, a*c, and b*c is less than x*y, the image recognition module 302 determines that the object 2 is able to fit inside the opened mouth of the infant.

When the object 2 is a composite of multiple sub-objects having regular shapes, a length, a width, and a height of each sub-object is determined and a product of length*width, length*height, and width*height of each sub-object is calculated to determine whether any product of any sub-object is smaller than a product of the width*height of the opened mouth of the infant.

Figure 4:
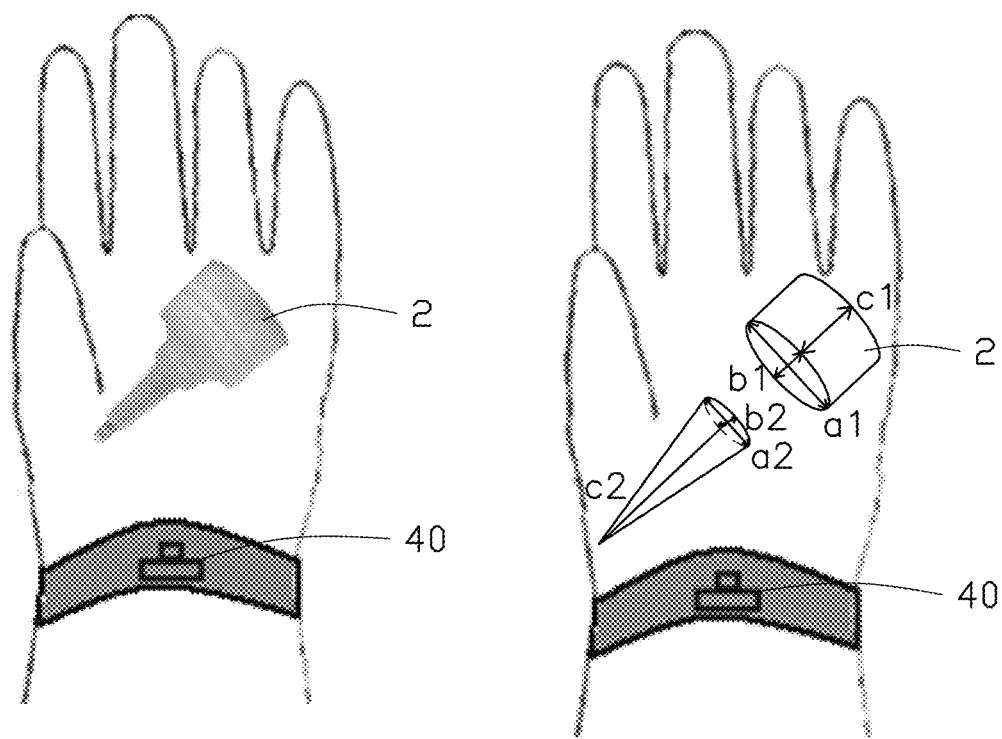
FIG. 4 is a diagram of a composite object having regular shapes.

For example, referring to FIG. 4, the image recognition module 302 recognizes the object 2 being composed of a cylindrical portion and a conical portion. The cylindrical portion has a length "a1", a width "b1", and a height "c1". The conical portion has a length "a2", a width "b2", and a height "c2". When any of the products a1*b1, a1*c1, b1*c1, a2*b2, a2*c2, and b2*c2 are less than x*y, the image recognition module 302 determines that the object 2 is able to fit inside the mouth of the infant.

When the object 2 is an irregularly-shaped object, a length, a width, and a height of each side of each sub-object of the object 2 is determined, and a product of length*width, length*height, and width*height of each side is calculated to determine whether any product of any side is smaller than a product of the width*height of the opened mouth of the infant.

Figure 5:
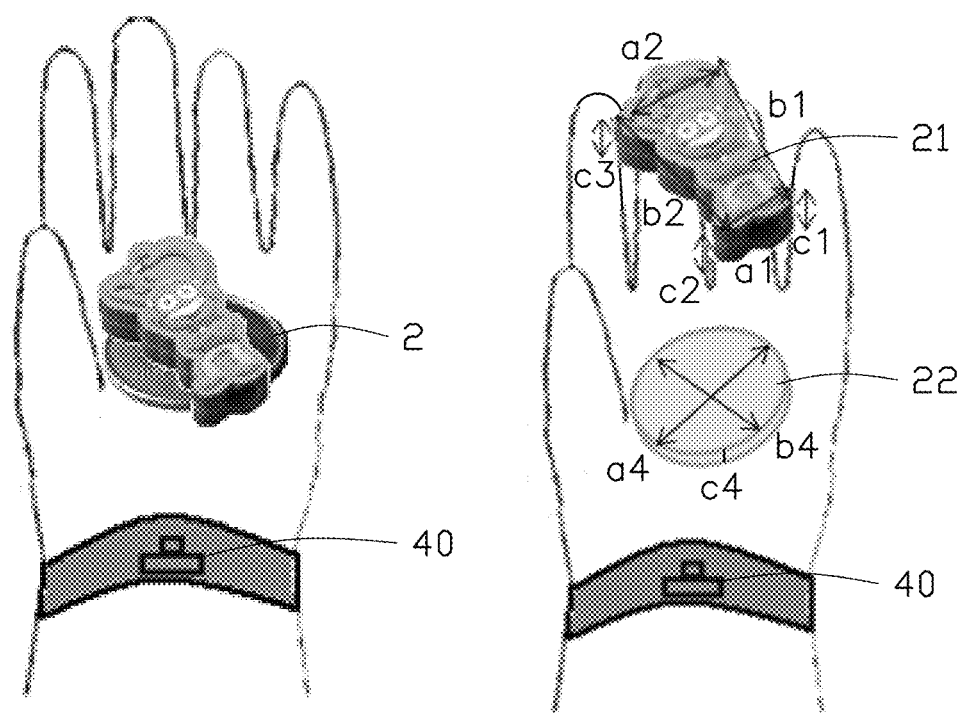
FIG. 5 is a diagram of an object having an irregular shape.

For example, referring to FIG. 5, the image recognition module 302 determines that the object 2 includes a first sub-object 21 and a second sub-object 22. The first sub-object 21 includes size dimensions "a1", "b1", "a2", "b2", "c1", "c2", and "c3". The second sub-object 22 is cylindrical and includes size dimensions "a4", "b4", and "c4". If any of the products of the first sub-object 21 (a1*b1, a1*c1, a2*c3, etc.) are less than the product of x*y, or if any of the products of the second sub-object 22 (a4*b4, a4*c4, or b4*c4) are less than the product of x*y, then the image recognition module 302 determines that the object 2 is able to fit inside the mouth of the infant.

When the image recognition module 302 determines that the object 2 is able to fit inside the mouth of the infant, the tracking module 303 controls the camera 40 to detect in real time a state of the object 2 and whether the mouth of the infant is open. In at least one embodiment, the tracking module 303 utilizes an image comparison method to determine the state of the object 2 and whether the mouth of the infant is open.

When the camera 40 detects that the object 2 is held steady in the hand of the infant and that the mouth of the infant is open, the prompting module 304 controls the prompter 50 to emit a prompt. In at least one embodiment, the prompter 50 includes a vibrator 501 and a speaker 502. The vibrator 501 may be a buzzer configured to vibrate to distract the infant, thereby preventing the infant from putting the object 2 in the mouth. The speaker 502 may be a loudspeaker configured to emit sound to alert a parent to stop the infant from putting the object 2 in the mouth.

Figure 6:
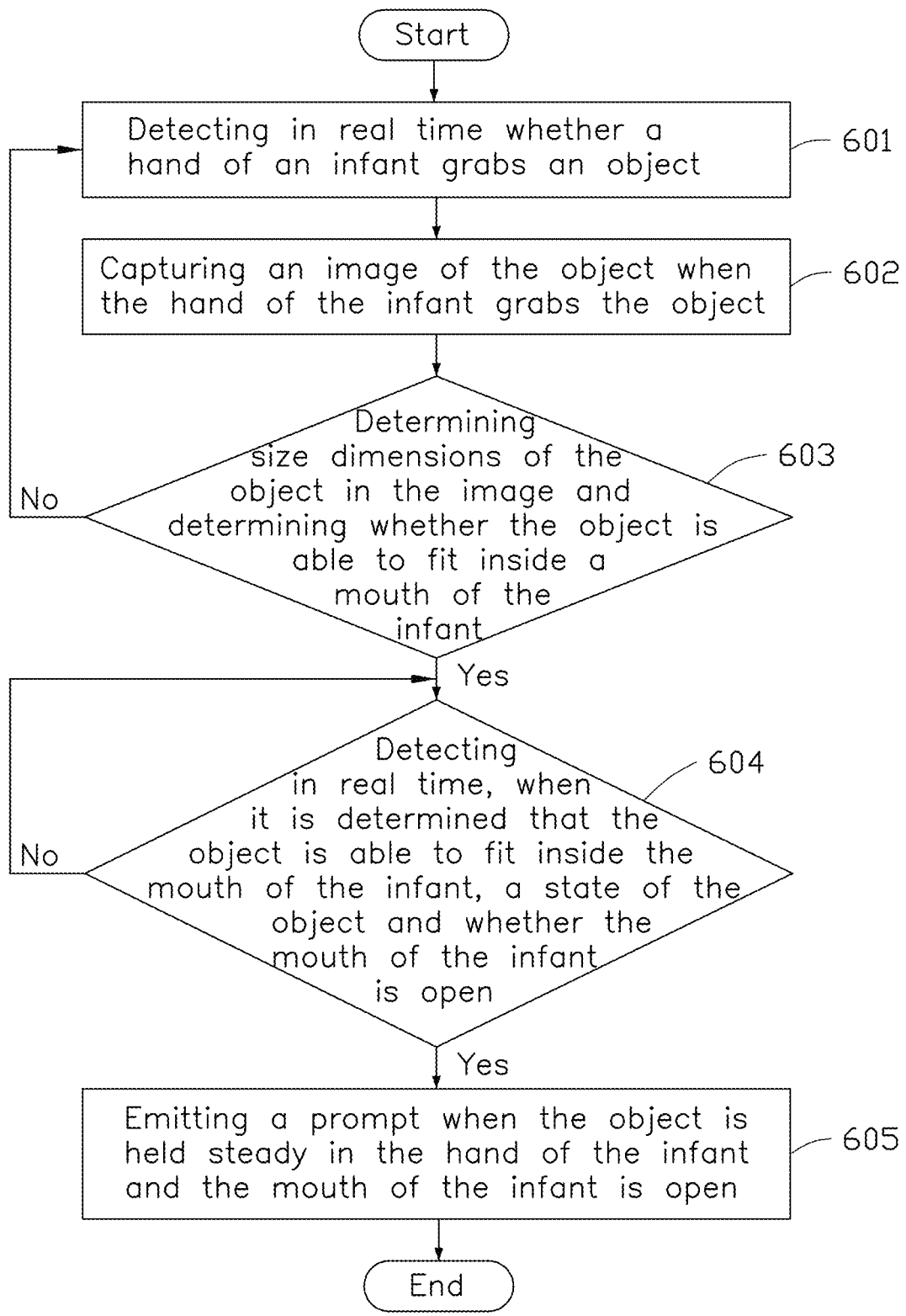
FIG. 6 is a flowchart diagram of a method for monitoring an infant.

FIG. 6 illustrates a flowchart of a method for monitoring an infant. The example method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 601.

At block 601, when a monitoring bracelet is put on an infant, a camera of the monitoring bracelet detects in real time whether a hand of the infant grabs an object.

At block 602, when the hand of the infant grabs an object, the camera captures an image of the object.

At block 603, size dimensions of the object in the image are determined, and whether the object is able to fit inside a mouth of the infant is determined.

In detail, when the object is a regular shape, a length, a width, and a height of the object are determined, and a product of length*width, length*height, and width*height is calculated to determine whether any product is smaller than a product of the width*height of the opened mouth of the infant. When any product is smaller than the product of the width*height of the opened mouth of the infant, then it is determined that the object is able to fit inside the opened mouth of the infant.

When the object is a composite of multiple sub-objects having regular shapes, a length, a width, and a height of each sub-object is determined and a product of length*width, length*height, and width*height of each sub-object is calculated to determine whether any product of any sub-object is smaller than a product of the width*height of the opened mouth of the infant.

When the object is an irregularly-shaped object, a length, a width, and a height of each side of each sub-object of the object is determined, and a product of length*width, length*height, and width*height of each side is calculated to determine whether any product of any side is smaller than a product of the width*height of the opened mouth of the infant.

At block 604, when it is determined that the object is able to fit inside the mouth of the infant, the camera is controlled to detect in real time a state of the object and whether the mouth of the infant is open.

At block 605, when the camera detects that the object is held steady in the hand of the infant and that the mouth of the infant is open, a prompter of the monitoring bracelet is controlled to emit a prompt. The prompter includes a vibrator and a speaker. The prompt includes a vibration of the vibrator to distract the infant and a sound emitted by the speaker to alert a parent of the infant.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A monitoring bracelet comprising:
a camera;
a prompter;
a storage configured to store size dimensions of an opened mouth of an infant; and
a processor configured to execute a plurality of instructions stored in the storage which cause the processor to:
control the camera, when an object is grasped in a hand of the infant, to capture an image of the object;
analyze size dimensions of the object according to the image and determine whether the object is able to fit inside the mouth of the infant;
control the camera to detect the object in real time, when the object is determined to be able to fit inside the mouth of the infant, and detect whether the mouth of the infant is opened; and control the prompter to emit a prompt, when the camera detects that the object is held in the hand of the infant and the mouth of the infant is opened.

2. The monitoring bracelet of claim 1, wherein the prompter comprises a vibrator or a speaker; and the vibrator is controlled to vibrate, and the speaker is controlled to emit sound.

3. The monitoring bracelet of claim 1, wherein the size dimensions of the opened mouth of the infant comprise a width and a height of the opened mouth.

4. The monitoring bracelet of claim 3, wherein when the object is a regular shape, a length, a width, and a height of the object are determined, and a product of length*width, length*height, and width*height are calculated to determine whether any product is smaller than a product of the width*height of the opened mouth of the infant.

5. The monitoring bracelet of claim 3, wherein when the object is a composite of multiple sub-objects having regular shapes; a length, width, and height of each sub-object is determined and a product of length*width, length*height, and width*height of each sub-object are calculated to determine whether any product of any sub-object is smaller than a product of the width*height of the opened mouth of the infant.

6. The monitoring bracelet of claim 3, wherein when the object is an irregularly-shaped object, a length, a width, and a height of each side of each sub-object of the object is determined, and a product of length*width, length*height, and width*height of each side is calculated to determine whether any product of any side is smaller than a product of the width*height of the opened mouth of the infant.

7. A method for monitoring an infant implemented in a monitoring bracelet comprising a storage configured to store size dimensions of an opened mouth of an infant, the method comprising:

capturing, by a camera of the monitoring bracelet, an image of an object when the object is in a hand of the infant;

determining size dimensions of the object according to the image to determine whether the object is able to fit inside the mouth of the infant;

detecting in real time, when it is determined that the object is able to fit inside the mouth of the infant, a state of the object and whether the mouth of the infant is opened; and controlling a prompter of the monitoring bracelet to emit a prompt when the camera detects that the object is held in the hand of the infant and the mouth of the infant is opened.

8. The monitoring method of claim 7, wherein the prompter comprises a vibrator or a speaker; the vibrator is controlled to vibrate, and the speaker is controlled to emit sound.

9. The monitoring method of claim 7, wherein the size dimensions of the opened mouth of the infant comprise a width and a height of the opened mouth.

10. The monitoring method of claim 9, wherein when the object is a regular shape, a length, a width, and a height of the object are determined, and a product of length*width, length*height, and width*height are calculated to determine whether any product is smaller than a product of the width*height of the opened mouth of the infant.

11. The monitoring method of claim 9, wherein when the object is a composite of multiple sub-objects having regular shapes; a length, width, and height of each sub-object is determined and a product of length*width, length*height, and width*height of each sub-object are calculated to determine whether any product of any sub-object is smaller than a product of the width*height of the opened mouth of the infant.

12. The monitoring method of claim 9, wherein when the object is an irregularly-shaped object, a length, a width, and a height of each side of each sub-object of the object is determined, and a product of length*width, length*height, and width*height of each side is calculated to determine whether any product of any side is smaller than a product of the width*height of the opened mouth of the infant.

* * * * *